(12) United States Patent  
Zhang et al.

(10) Patent No.: US 11,630,043 B2
(45) Date of Patent: Apr. 18, 2023

(54) EXPERIMENTAL DEVICES FOR SIMULATING EROSION OF TUBING STRINGS CAUSED BY SAND PRODUCTION

(71) Applicant: SOUTHWEST PETROLEUM UNIVERSITY, Sichuan (CN)

(72) Inventors: Zhi Zhang, Chengdu (CN); Jie Yang, Chengdu (CN); You Wu, Chengdu (CN); Jian Ding, Chengdu (CN); Jiawei Wang, Chengdu (CN)

(73) Assignee: SOUTHWEST PETROLEUM UNIVERSITY, Chengdu (CN)

( * ) Notice: Subject to any disclaimer, the term of this patent is extended or adjusted under 35 U.S.C. 154(b) by 0 days.

(21) Appl. No.: 17/648,812

(22) Filed: Jan. 25, 2022

(65) Prior Publication Data
US 2022/0373445 A1  Nov. 24, 2022

(30) Foreign Application Priority Data
May 20, 2021  (CN) .......................... 202110549063.2

(51) Int. Cl.
G01N 3/56  (2006.01)

(52) U.S. Cl.
CPC ..... G01N 3/567 (2013.01); *G01N 2203/0246* (2013.01)

(58) Field of Classification Search
CPC . G01N 3/567; G01N 2203/0246; G01N 3/565
(Continued)

(56) References Cited

U.S. PATENT DOCUMENTS 4,928,760 A * 5/1990 Freitas .................. E21B 47/017
166/902
4,945,758 A * 8/1990 Carpenter ............... F16L 55/00
73/86

(Continued)

FOREIGN PATENT DOCUMENTS

CN  101413860 A  4/2009
CN  161413660 A  4/2009

(Continued)

OTHER PUBLICATIONS

Peng, Engao et al., Synergic Wear of Impact Erosion and Cavitations Erosion Test Equipment and its Experimental Study, Lubrication Engineering, 32(4): 20-23, 2007.

(Continued)

*Primary Examiner* — Robert R Raevis
(74) *Attorney, Agent, or Firm* — Metis IP LLC

(57) ABSTRACT

The present disclosure provides an experimental device for simulating the erosion of a tubing string caused by sand production. The experimental device includes an autoclave, a circulating assembly, a power assembly, a monitoring assembly, or a three-phase feeding assembly. The circulating assembly is sealed and arranged in the autoclave, the circulating assembly includes a circulation loop formed by straight pipes and elbows. The power assembly includes a pump arranged on the circulation loop. The monitoring assembly includes a flowmeter and a temperature and pressure sensor for detecting the circulation loop, and the temperature and pressure sensor is communicatively connected with a PC. The three-phase feeding assembly includes a feeding pipe that is in fluid communication with the circulation loop, and the feeding pipe is connected with one or more gas tanks, a sander feeder, and one or more liquid tanks, respectively.

9 Claims, 4 Drawing Sheets

(58) Field of Classification Search
USPC .............. 73/7, 86, 865.6; 166/250.01, 250.05
See application file for complete search history.

(56) References Cited

U.S. PATENT DOCUMENTS

| | | |
|---|---|---|
| 2004/0206171 A1 | 10/2004 | Feierabend et al. |
| 2008/0282781 A1 | 11/2008 | Hemblade |
| 2020/0324323 A1 | 10/2020 | Bruntveit et al. |

FOREIGN PATENT DOCUMENTS

| | | | |
|---|---|---|---|
| CN | 201594066 U | | 9/2010 |
| CN | 101865816 A | | 10/2010 |
| CN | 102654446 A | | 9/2012 |
| CN | 103149144 A | | 6/2013 |
| CN | 103630455 A | | 3/2014 |
| CN | 104034649 A | | 9/2014 |
| CN | 104330320 A | | 2/2015 |
| CN | 105547885 | * | 5/2016 |
| CN | 105842097 A | | 8/2016 |
| CN | 105928813 | * | 9/2016 |
| CN | 206095848 U | | 4/2017 |
| CN | 106768844 A | | 5/2017 |
| CN | 108267381 A | | 7/2018 |
| CN | 109856036 A | | 6/2019 |
| CN | 109991111 | * | 7/2019 |
| CN | 110867757 A | | 3/2020 |
| CN | 210923372 U | | 7/2020 |
| CN | 111678827 A | | 9/2020 |
| CN | 211478006 U | | 9/2020 |
| CN | 211718076 U | | 10/2020 |
| CN | 112014255 | * | 12/2020 |

OTHER PUBLICATIONS

Jing, Jiaqiang et al., Local Erosion Behavior Induced by Sand Blast for a Square Band of 304SS Steel, Corrosion Science and Protection Technology, 27(5): 437-443, 2015.

Wangguo, Yuwei et al., Experimental Simulation Research of Sand Erosion in Gas Pipeline, Journal of Materials Science & Engineering, 34(2): 310-315, 2016.

Zhang, Zhi et al., The influence of hydrogen sulfide on internal pressure strength of carbon steel production casing in the gas well, Journal of Petroleum Science and Engineering, 191: 1-12, 2020.

Mariella Leporini et al., Sand transport in multiphase flow mixtures in a horizontal pipeline: An experimental investigation, Petroleum, 5(2): 161-170, 2019.

Li, Jing, Study on Environment Sensitive Fracture of Stainless Steel Tubing in High Temperature High Pressure Deep Wells, Chinese Doctoral Dissertations Full-text Database, 2018, 150 pages.

First Office Action in Chinese Application No. 202110549063.2 dated Jun. 24, 2021, 8 pages.

Decision to Grant a Patent in Chinese Application No. 202110549063.2 dated Jul. 7, 2021, 3 pages.

* cited by examiner

EXPERIMENTAL DEVICES FOR SIMULATING EROSION OF TUBING STRINGS CAUSED BY SAND PRODUCTION

CROSS-REFERENCE TO RELATED APPLICATIONS

This application claims priority to Chinese Patent Application No. 202110549063.2 filed on May 20, 2021, the contents of which are hereby incorporated by reference to its entirety.

TECHNICAL FIELD

The present disclosure relates to the technical field of material testing, and in particular, to experimental devices for simulating erosion of tubing strings caused by sand production.

BACKGROUND

In the current exploration and development of oil and gas wells, the problem of strings failure, which is caused by the sand production of oil and gas wells under high temperature and high pressure, is becoming more serious. The strings failure may be caused by the interaction of erosion and corrosion. However, the existing device is difficult to simulate erosion of tubing strings caused by sand production in a wellbore with high temperature and high pressure. Accordingly, it is urgent to provide experimental devices and methods for simulating erosion of tubing strings under high temperature and high pressure, studying the influence mechanism of sand production in a wellbore under high temperature and high pressure conditions on performance of tubing strings, and clarifying the impact of factors, such as distribution of sand particle size, quantities of sand production, flow velocity, temperature, and pressure on life of tubing strings, so as to ensure the service life of oil and gas well pipes for sand production and wellbore integrity. Therefore, the simulation of sand production in well stratum is of great significance to erosion experiments of tubing strings.

SUMMARY

To solve the shortcomings of the previous experimental instrument for simulating erosion of sand production under high temperature and high pressure, the present disclosure provides an experimental device which may better simulate the environment where tubing strings are located, such as high temperature resistance, high pressure resistance, and corrosion resistance environment. The experimental device may be convenient for operation and cost-saving, and simulate the impact of multiple factors on sand erosion by providing samples under the condition of sand erosion.

In order to achieve the above purpose, the present disclosure provides an experimental device for simulating erosion of a tubing string caused by sand production. The experimental device may comprise an autoclave, a circulating assembly, a power assembly, a monitoring assembly, or a three-phase feeding assembly. The circulating assembly may be sealed and arranged in the autoclave. The circulating assembly may include a circulation loop formed by straight pipes and elbows, a horizontal section of the circulation loop may be provided with a test string, and samples may be arranged at both sides of the circulation loop. The power assembly may include a pump arranged on the circulation loop. The monitoring assembly may include a flowmeter and a temperature and pressure sensor for detecting the circulation loop, and the temperature and pressure sensor may be communicatively connected with a PC. The three-phase feeding assembly may include a feeding pipe connected with the circulation loop, and the feeding pipe may be connected with one or more gas tanks, a sand feeder, and one or more liquid tanks, respectively.

In some embodiments, at least one of the one or more gas tanks may be configured with an air inlet valve, the sand feeder may be configured with a sand inlet valve, and the one or more gas tanks and the sand feeder may be configured with an air and solid inlet valve, a compressor may be arranged between the one or more gas tank and the air and solid inlet valve or between the sand feeder and the air and solid inlet valve, the one or more liquid tanks may be configured with a liquid inlet valve, and the feeding pipe may be configured with a main valve.

In some embodiments, the autoclave may be a cylindrical tank, and the autoclave may be made of materials with good corrosion resistance, high temperature resistance, and high pressure resistance.

In some embodiments, an outer surface of the autoclave may be sleeved with a heating sleeve, an exhaust port is located at an upper end of the autoclave, and the exhaust port may be connected with the circulation loop.

In some embodiments, the samples may be mounted at a left vertical section, a right vertical section, and the elbows of the circulation loop, a pipe wall of the circulation loop may be provided with a circular opening, the samples may be embedded at the circular opening, the samples may be fixed on the pipe wall of the circulation loop through a base, one or more screw bolts, and a sealing ring, and the base may be resistant to a high temperature, a high pressure, and corrosion.

In some embodiments, the test string may be connected with the circulation loop through a metal flange.

In some embodiments, the sand feeder may be configured with a screen pipe connected with the feeding pipe.

In some embodiments, the circulation loop may be provided with a backflow preventer.

In some embodiments, the elbows may be made of C276 alloy, and the elbows may be connected with the straight pipes through the metal flange.

In some embodiments, the experimental device may further comprise a sand discharge assembly. The sand discharge assembly may include a gravel collector connecting with a sand discharge port of the circulation loop, the circulation loop may be provided with a sand discharge valve at the sand discharge port, the gravel collector may be provided with a filter, and a collection port of the gravel collector may be connected with a treatment tank.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

Figure 1:
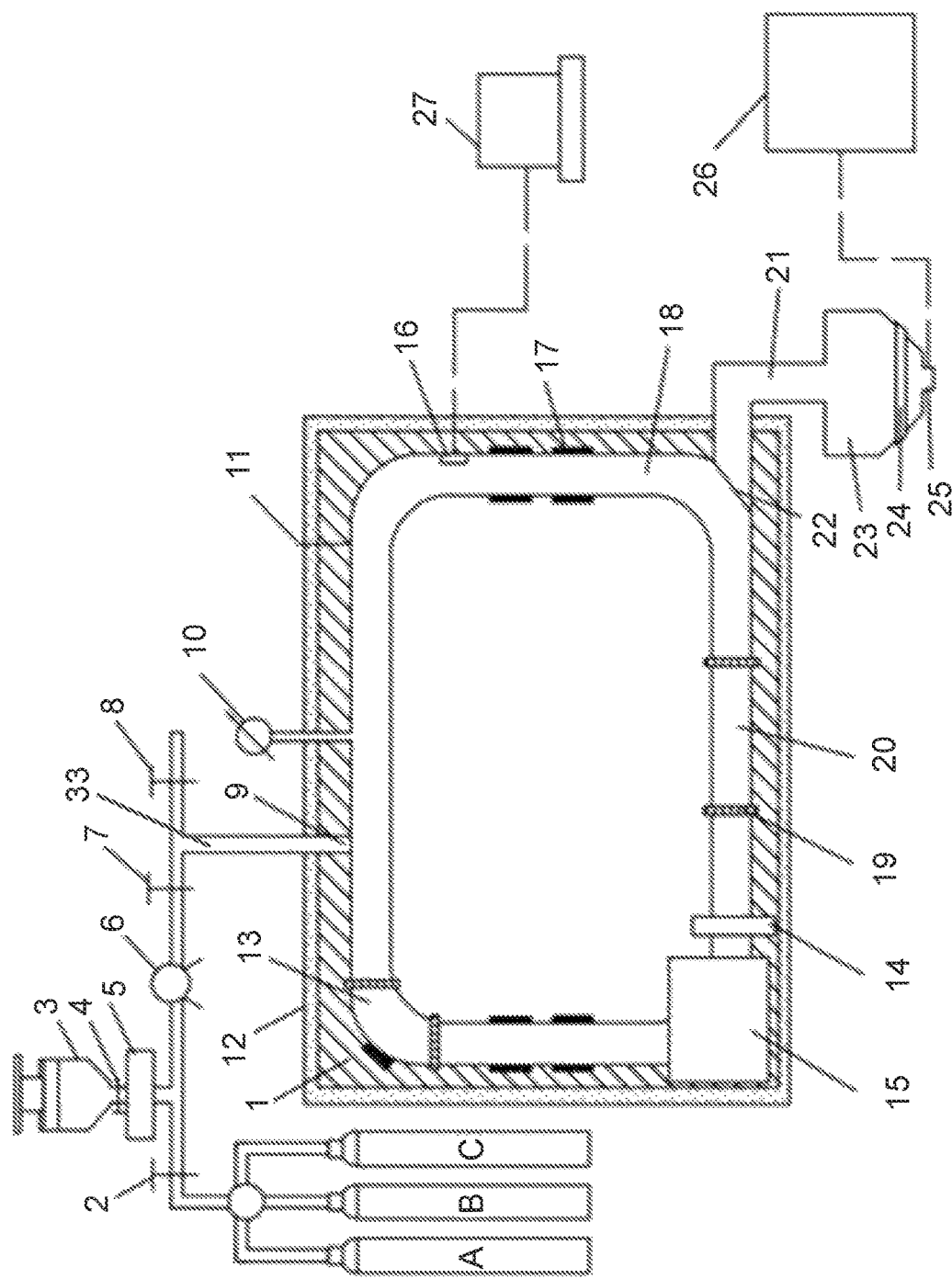
FIG. 1 is a schematic diagram illustrating an exemplary experimental device for simulating erosion of a tubing string caused by sand production according to some embodiments of the present disclosure.

Labels in the drawing: 1—autoclave, 2—inlet valve, 3—sand feeder, 4—sand inlet valve, 5—screen pipe, 6—compressor, 7—air and solid inlet valve, 8—liquid inlet valve, 9—main valve, 10—flowmeter, 11—exhaust port, 12—heating sleeve, 13—elbows, 14—backflow preventer, 15—pump, 16—temperature and pressure sensor, 17—samples, 18—circulation loop, 19—metal flange, 20—test string, 21—sand discharge port, 22—sand discharge valve, 23—gravel collector, 24—filter, 25—collection port, 26—treatment tank, 27—PC, 28—base, 29—screw bolts, 30—sealing ring, 31—throat, 31-1—straight section, 31-2—inclined section, 32—fan plates, 33—feeding pipe, 34—pipe wall, 35—opening.

DETAILED DESCRIPTION

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

It will be understood that the terms "system," "engine," "unit," "module," and/or "block" used herein are one method to distinguish different components, elements, parts, sections, or assemblies of different levels in ascending order. However, the terms may be displaced by other expressions if they may achieve the same purpose.

It will be understood that when a unit, an engine, a module, or a block is referred to as being "on," "connected with," or "coupled to" another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

The terminology used herein is for the purposes of describing particular examples and embodiments only and is not intended to be limiting. As used herein, the singular forms "a," "an," and "the" may be intended to include the plural forms as well, unless the context clearly indicates otherwise. It will be further understood that the terms "include" and/or "comprise," when used in this disclosure, specify the presence of integers, devices, behaviors, stated features, steps, elements, operations, and/or components, but do not exclude the presence or addition of one or more other integers, devices, behaviors, features, steps, elements, operations, components, and/or groups thereof.

In addition, it should be understood that in the description of the present disclosure, the terms "first", "second", or the like, are only used for the purpose of differentiation, and cannot be interpreted as indicating or implying relative importance, nor can be understood as indicating or implying the order.

According to an experimental device for simulating erosion of a tubing string caused by sand production, gravel is added through a sand feeder, corrosive gas is added into one or more gas tanks, and/or liquid is added into one or more liquid tanks to simulate gas-sand or liquid-sand two-phase fluid and gas-liquid-solid three-phase fluid. A pump is started to make the fluid circulate in an autoclave to simulate experimental conditions that is closer to or same as the working conditions of the actual sand production wellbore. Then, flow velocity of the fluid is monitored by a flowmeter and temperature and pressure of the fluid are monitored by a temperature and pressure sensor to simulate a high temperature, high pressure, and dynamic corrosion environment. The experimental device may simulate erosion experiments of samples caused by sand production with different particle sizes, different flow velocities, different quantities of sand production, and/or different erosion angles, simulate erosion experiments of a vertical section and/or a horizontal section at the same time, and simulate experimental conditions that is the dynamic working conditions under high temperature and high pressure. The experimental results are more accurate in studying the impact of sand production on the performance of oil well pipes.

The autoclave and the circulating loop of the experimental device are made of C276 alloy, the internal mechanism is made of stainless steel, which is resistant to a high temperature, a high pressure, and corrosion, and the connection between the circulation loop and the samples are effectively sealed with a sealing ring (e.g. a Teflon sealing ring), which has the advantages of simple operation, cost-saving, and good sealing effect.

Simulating erosion of a tubing string in the stratum through experiments, it is of great reference significance to ensure the service life of oil and gas well pipes and the wellbore integrity. Therefore, some embodiments of the present disclosure provide an experimental device for simulating erosion of the tubing string caused by sand production, which is used to simulate erosion of sand production such as gas-sand or liquid-sand two-phase fluid and gas-liquid-solid three-phase fluid, so as to facilitate the study of the performance of oil and gas well pipes.

FIG. 1 is a schematic diagram illustrating an exemplary experimental device for simulating erosion of a tubing string caused by sand production according to some embodiments of the present disclosure.

As shown in FIG. 1, an experimental device for simulating erosion of a tubing string caused by sand production may include an autoclave 1, a circulating assembly, a power assembly, a monitoring assembly, or a three-phase feeding assembly.

The autoclave 1 (also referred to as a high temperature autoclave) may be a container capable of achieving a high temperature state and a high pressure state. For example, the autoclave 1 may be used to simulate the high temperature and high pressure environment of the stratum. In some embodiments, a cavity may be inside the autoclave 1, and the cavity may be used to accommodate the circulating assembly, the power assembly, or the like, or a combination thereof.

The circulating assembly may be used for the circulation flowing of the simulated fluid of sand production. In some embodiments, the circulating assembly may be sealed and arranged in the autoclave 1. The circular assembly may include a circulation loop 18 formed by straight pipes and elbows 13. In some embodiments, the circulation loop 18 may be arranged close to the inner wall of the autoclave 1. For example, the autoclave 1 may be a rectangle shape. The inner wall of the autoclave 1 may include flat segments (e.g., horizontal segments and vertical segments) and transition segments between two adjacent straight segments. Two adjacent straight segments may be connected through a transition segment. The elbows 13 of the circulation loop 18 may be arranged at a turning point (or a transition segment) between two adjacent straight segments of the inner wall of the autoclave 1. The straight pipes of the circulation loop 18 may be arranged at the flat segments of the inner wall (e.g., horizontal segments and vertical segments) of the autoclave 1. In some embodiments, a plurality of straight pipes and a plurality of elbows may be connected in turn to form an annular path (i.e., a circulation loop 18). In some embodiments, one of the flat segments (e.g., horizontal segments and vertical segments) of the inner wall of the autoclave 1 may be arranged more than one straight pipe. In some embodiments, one of the transition segments of the inner wall of the autoclave 1 may be arranged more than one elbow. In some embodiments, the flat segments (e.g., horizontal segments and vertical segments) and transition segments of the inner wall of the autoclave 1 may be an integrated structure. In some embodiments, the flat segments (e.g., horizontal segments and vertical segments) and transition segments of the inner wall of the autoclave 1 may be separated from each other.

In some embodiments, the horizontal section of the circulation loop 18 may be provided with a test string 20, and the horizontal section may be defined based on the placement orientation of the circulation loop 18 in use. The test string 20 may be located inside the horizontal section of the circulation loop 18 (i.e., inside the straight pipes). In some embodiments, the horizontal section may be understood as a section of the circulation loop 18 perpendicular to the direction of gravity. In some embodiments, the test string 20 may have the same material as pipes in an oil and gas well. The test string 20 may be set in the horizontal section, which may be used to simulate the erosion experiment of the horizontal section of an oil and gas well in the downhole (such as an extended reach well). In some embodiments, the test string 20 may be arranged on the vertical section of the circulation loop 18, that is, a section parallel to the direction of the gravity.

In some embodiments, the samples 17 may be arranged at different locations inside the circulation loop 18. For example, the samples 17 may be arranged at both sides of the circulation loop 18. The both sides of the circulation loop 18 may be vertical sections (e.g., the left vertical section and the right vertical section) of the circuiting loop 18. In some embodiments, the samples 17 may be mounted at the vertical sections (e.g., the left vertical section and the right vertical section) and the elbows 13 of the circulation loop 18, and the effect of different erosion angles on the samples 17 may be simulated. In some embodiments, the samples 17 may be arranged inside the circulation loop 18 and on the inner surface of the circulation loop 18 (i.e., the inner surface of the pipes defining the circulation loop 18). In some embodiments, the samples 17 located at different locations inside the circulation loop 18 may have different materials, and the material of one of the samples 17 may be a material of an oil and gas well pipe, such as a drill pipe, a casing pipe, an oil pipe, a sand control pipe, or the like, which is convenient to simulate the erosion experiment of oil and gas well pipes of different materials in a corrosive environment. For example, one of the samples 17 that is arranged at a vertical section of the circulation loop 18 may include a material that is same as the material of the drill pipe, one of the samples 17 that is arranged at one of the elbows 13 of the circulation loop 18 may include a material that is same as the material of the sand control pipe. In some embodiments, samples arranged at the same position of the circulation loop 18 may be one or more block samples. In some embodiments, the block samples may be distributed at intervals along the circumferential direction of the inner surface of the pipe (e.g., the straight pipe) defining the circulation loop 18. In some embodiments, one or more samples at the same position on the circulation loop 18 may be annular samples the shape and sizes of which are adapted to the circumferential shape and sizes of the pipe, respectively.

Figure 2:
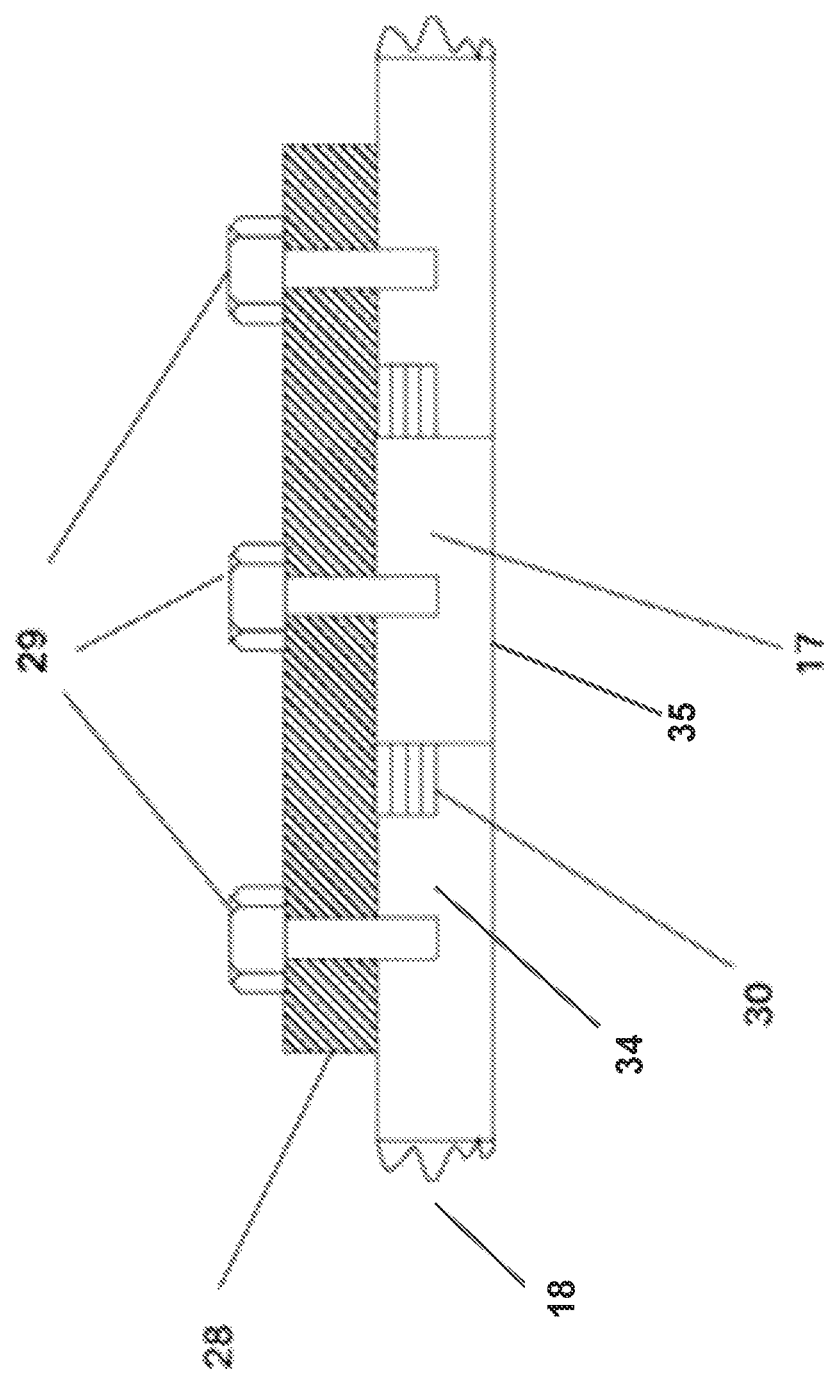
FIG. 2 is a schematic diagram illustrating an exemplary installation of a sample according to some embodiments of the present disclosure.

FIG. 2 is a schematic diagram illustrating an installation of a sample according to some embodiments of the present disclosure.

Referring to FIG. 2, the pipe wall 34 (e.g., a straight pipe) that defines a section (e.g., the right vertical section, the elbows 13) of the circulation loop 18 may be provided with an opening 35. The sample 17 may be arranged in the opening 35. In some embodiments, the sample 17, which is mounted on one of the left vertical section, the right vertical, and/or the elbows 13 in the circulation loop 18 of the autoclave 1, may be embedded in the opening 35 of the pipe wall 34 of the circulation loop 18. In some embodiments, the opening 35 of the pipe wall 34 of the circulation loop 18 may be a circular opening, and the sample 17 may also be circular, the sample 17 may be embedded at the circular opening to ensure that the eroded circular surface of the sample 17 that is eroded by the fluid in the circulation loop 18 and the inner surface of the pipe wall 34 of the circulation loop 18 is flush and a transition between the eroded circular surface of the sample 17 of the inner surface of the pipe wall 34 of the circulation loop 18 is smooth. The inner surface of the pipe wall 34 of the circulation loop 18 may contact the fluid in the circulation loop 18. The pipe wall 34 of the circulation loop 18 may include an inner wall and an outer wall, and the cavity of the circulation loop 18 may be formed between the inner wall and the outer wall.

In some embodiments, the sample 17 may be fixed on the pipe wall 34 of the circulation loop 18 through a base 28, one or more screw bolts 29, and a sealing ring 30 (e.g., a Teflon sealing ring). The base may be resistant to a high temperature, a high pressure, and corrosion. On the premise of ensuring the sealing, the erosion experiments of the samples 17 of different materials in a corrosion environment that includes the gas-sand two-phase fluid or the gas-liquid-solid three-phase fluid may be simulated at the same time.

Referring back to FIG. 1, the power assembly may include a pump 15 (also referred to as a high temperature and pressure pump) arranged on the circulation loop 18. The pump may be resistant to a high temperature and a high pressure. The pump 15 may be in fluid communication with the circulation loop 18. In some embodiments, the pump 15 may be a portion of the circulation loop 18. In some embodiments, the pump 15 may be connected with the circulation loop 18. The pump 15 may be used to provide the driving force of circulating flowing for the fluid in the circulation loop 18. In some embodiments, the pump 15 may be arranged at one of the elbows of the circulation loop 18, and the bottom and sides of the pump 15 may rest against the adjacent flat segments of the inner wall of the autoclave 1 to increase the stability of the pump 15. In some embodiments, the pump 15 may be arranged at the horizontal or vertical sections of the circulation loop 18. In some embodiments, the bottom of the pump 15 may rest against the flat segments of the inner wall of the autoclave 1 to increase the stability of the pump 15.

The monitoring assembly may be an assembly for monitoring parameters (also referred to as fluid parameters) of the fluid within the circulating assembly (e.g., a circulation loop 18). The fluid parameters may include a rate of flow, a temperature, a pressure, or the like. In some embodiments, the monitoring assembly may include a flowmeter 10 (also referred to as a high temperature and pressure flowmeter) and a temperature and pressure sensor 16 for detecting the circulation loop 18. The flowmeter may be resistant to a high temperature and a high pressure. In some embodiments, the flowmeter 10 may be arranged inside the circulation loop 18 and located at the horizontal or vertical sections of the circulation loop 18 to monitor the rate of flow (i.e., flow rate) or velocity of flow (i.e., flow velocity) of the fluid in the circulation loop 18. The temperature and pressure sensor 16 may be arranged at the inner surface of the pipe wall for obtaining temperature and pressure information of the fluid within the circulation loop 18. In some embodiments, the flowmeter 10 and/or the temperature and pressure sensor 16 may be communicatively connected with a terminal device (e.g., PC 27) and transmit the obtained fluid parameters (e.g., temperature and pressure information) to the terminal device (e.g., PC 27) for processing or displaying. In some embodiments, the terminal device may include a personal computer (e.g., PC 27), a mobile phone, a tablet computer, a virtual reality terminal, or the like. The experimental device may monitor the circulation loop 18 by using the flowmeter 10 and the temperature and pressure sensor 16 to facilitate the recording of an erosion rate, a temperature, a pressure, or the like.

The three-phase feeding assembly may be an assembly for adding gas, liquid, and/or solid to the circulation loop 18. In some embodiments, the three-phase feeding assembly may include a feeding pipe 33 that is in fluid communication with the circulation loop 18. The feeding pipe 33 may be connected with one or more gas tanks, a sand feeder 3, and one or more liquid tanks, respectively. The one or more gas tanks may be used to add one or more types of gas (e.g., corrosive gas or non-corrosive gas) to the circulation loop 18. The sand feeder 3 may be used to add solids such as gravel to the circulation loop 18. The one or more liquid tanks may be used to add one or more types of liquids such as oil or water to the circulation loop 18. In some embodiments, by connecting the one or more gas tanks, the sand feeder 3, and the one or more liquid tanks, selectively, the feeding pipe 33 may form different kinds of flowing erosion conditions of sand production in the circulation loop 18, such as a gas-sand two-phase fluid, a liquid-sand two-phase fluid, and a gas-liquid-solid three-phase fluid. In some embodiments, the one or more gas tanks, the sand feeder 3, and the one or more liquid tanks may be connected with the feeding pipe 33 through pipes, respectively, and the pipes connected with the one or more gas tanks, the sand feeder 3, and the one or more liquid tanks, respectively may be called the branches of the feeding pipe 33. The gas, solid, and/or liquid respectively in the one or more gas tanks, the sand feeder 3, and the one or more liquid tanks may enter the feeding pipe 33 through the branches, respectively, and then enter the circulation loop 18 after mixing.

In some embodiments, the one or more gas tanks may store a variety of corrosive gases (e.g., nitrogen ($N_2$), hydrogen sulfide ($H_2S$) or carbon dioxide ($CO_2$)) and/or non-corrosive gases. In some embodiments, the one or more gas tanks may be configured to store the same gas. In some embodiments, the gas tanks may be configured to store different gases. For example, A, B, and C in FIG. 1 may correspond to three kinds of gas tanks, which may be used to fill different corrosive gases, respectively, to facilitate the injection of a variety of corrosive gases into the circulation loop 18.

In some embodiments, at least one gas tank of the gas tanks (e.g., corrosive gas tanks A, B and/or C) may be configured with an air inlet valve 2, which is arranged at the outlet of the gas tank and is located on a branch of the feeding pipe separately connected with the gas tank. The air inlet valve 2 may control the flow and/or cut-off of gas. In some embodiments, the sand feeder 3 may be configured with a sand inlet valve 4, which is arranged at the outlet of the sand feeder 3 and is located on the branch of the feeding pipe separately connected with the sand feeder 3. The sand inlet valve 4 may control the flow and/or cut-off of solids. In some embodiments, the gas tank and the sand feeder 3 may be configured with a gas and solid inlet valve 7, which is located on a section of the feeding pipe that is in fluid communication with both the gas tank and the sand feeder 3. In other words, the gas tank and the sand feeder 3 may share the same inlet valve 7. The gas and solid inlet valve 7 may control the flow and/or cut-off of gas-solid two-phase fluid. As described herein, the section of the feeding pipe that is in fluid communication with both of the gas tank and the sand feeder 3 refers to the area in the feeding pipe where both the solid flowing out of the sand feeder 3 and the gas flowing out of the gas tank pass, but the liquid flowing out of the liquid tank does not pass. It should be noted that the positions of the one or more gas tanks, the sand feeder 3, and the one or more liquid tanks described in FIG. 1 are for illustration only and do not limit the protection scope of the invention. For example, the positions of the one or more liquid tanks and the one or more gas tanks may be exchanged, the one or more liquid tanks and the sand feeder 3 may be configured with a liquid-solid inlet valve, which is located on the pipe connected with the one or more liquid tanks and the sand feeder 3 at the same time. The liquid-solid inlet valve may control the flow and cut-off of liquid-solid two-phase fluids. For example, the liquid tank may be located on an intermediate position of the one or more gas tanks and the sand feeder 3. In some embodiments, the one or more liquid tanks (not shown in the figure) may be configured with a liquid inlet valve 8, which is arranged at the outlet of the one or more liquid tanks and is located on the branch of the feeding pipe separately connected with the one or more liquid tanks. The liquid inlet valve 8 may control the flow and cut-off of the liquid. In some embodiments, the feeding pipe may be provided with a main valve 9, which is arranged at the connection between the feeding pipe and the circulating loop 18 to control the flow and cut-off of two-phase fluid and/or three-phase fluid.

In some embodiments, the feed assembly may include a compressor 6, that is arranged between the one or more gas tanks and the gas and solid inlet valve 7 or between the sand feeder 3 and the gas and solid inlet valve 7. The compressor 6 may provide power for the gas and sand injected by the gas tank and the sand feeder 3, respectively to flow to the circulation loop 18. In some embodiments, the compressor 6 may increase the pressure of the fluid flowing to the circulation loop 18 to realize the boosting process of the fluid in the circulation loop 18.

In some embodiments, the sand feeder 3 may be configured with a screen pipe 5 connected with the feeding pipe. The screen pipe 5 may be a channel for screening solids (e.g., gravel) in a required particle size range. In some embodiments, the screen pipe may be provided with a plurality of screen holes, the solids (e.g., gravel) with a particle size less than the diameters of the screen holes may enter the feeding pipe through the screen holes, and the solids (e.g., gravel) with a particle size greater than the diameters of the screen holes may remain in the sand feeder 3. Accordingly, the erosion experiments of the samples caused by sand production with different particle sizes (e.g., 3 mm-10 cm) may be simulated through the screen pipe 5. In some embodiments, the screen pipe 5 connected with the sand feeder 3 may be detachable from the sand feeder 3 and the feeding pipe for replacing screen pipes including screen holes in different diameters. In other words, the screen pipes may be in different types, and each type of the screen pipes may correspond to a diameter of the screen hole. Different types of screen pipes may be matched for the sand feeder 3 according to the experimental requirements. In some embodiments, the screen pipe 5 may be arranged at the outlet of the sand feeder 3, or the screen pipe 5 may be placed in the cavity inside the sand feeder 3.

In some embodiments, the one or more liquid tanks may be configured to store a variety of liquids such as oil, clean water, or washing solution, respectively. Different liquid tanks may be selected according to the experimental requirements. In some embodiments, at least one of the one or more liquid tanks may be detachably connected with the feeding pipe. When it is necessary to clean the circulation loop 18, at least one of the one or more liquid tanks may be separated from the feeding pipe and the feeding pipe may be directly connected with the cleaning solution pipe.

In some embodiments, the autoclave 1 may be a cylindrical tank. Because the cylindrical tank has axial symmetry and the side wall of the cylindrical tank has no sudden change in shape, the stress distribution may be more uniform when loaded, which can improve the pressure bearing capacity to the internal high pressure environment.

The experimental device may simulate a corrosive gas environment, such as nitrogen, hydrogen sulfide, carbon dioxide, or the like, and/or an environment including water with a hypersalinity. Therefore, the autoclave 1 may be made of one or more materials with good corrosion resistance, high temperature resistance and high pressure resistance, such as metals or alloys containing nickel and/or chromium.

In some embodiments, the outer surface of the autoclave 1 may be sleeved with a heating sleeve 12. The heating sleeve 12 may be used to heat the autoclave 1 so that a high temperature environment may be formed or maintained in the autoclave 1.

In some embodiments, the autoclave 1 may be provided with an exhaust port 11 that is in fluid communication with the circulation loop 18. In some embodiments, when the pressure in the circulation loop 18 is too high, for example, when the actual pressure in the circulation loop 18 is higher than the preset maximum pressure threshold, the exhaust port 11 may be opened to release part of the gas, so as to relieve (i.e., decrease) the pressure of the circulation loop 18. In some embodiments, the exhaust port 11 may be located at the upper end of the autoclave 1.

In some embodiments, the test string 20, which is used for the experiment in the horizontal section of the circulation loop 18, may be connected with the circulation loop 18 through a metal flange 19, which may simulate the erosion experiment of the horizontal section of the extended reach well in the downhole. The metal flange 19 may have the advantages of convenient connection and high pressure bearing, which can improve the stability of the connection between the test string 20 and the circulation loop 18 (i.e., the wall of the pipes (i.e., a pipe wall) defining the circulation loop 18). In some embodiments, the length of the test string 20 may be proportional to the length of one of the samples 17. In some embodiments, the length of the test string 20 may not be less than three times the length of one of the samples 17, so as to ensure that the test string 20 may have a large erosion displacement, and then simulate the erosion experiment of the horizontal section of the extended reach well in the downhole. In some embodiments, the length of the test string 20 may not be related to the length of the sample 17.

In some embodiments, in the circulation loop 18, the pump 15 may be used to circulate the fluid in the autoclave 1. A backflow preventer 14 may be installed in the pump 15 to ensure the fluid in the circulation loop 18 to flow in one direction, and the flow velocity may be monitored at any time through the flowmeter 10 to simulate the erosion experiment of the samples at different flow velocities. In some embodiments, the backflow preventer 14 may be a check valve, and the backflow preventer 14 may be arranged at the outlet of the pump 15 to prevent the backflow fluid from entering the pump 15 again, causing damage to the pump 15.

In some embodiments, at least one of the elbows 13 of the circulation loop 18 may be made of C276 alloy, that is, nickel-molybdenum-chromium-iron-tungsten nickel base alloy, and this kind of elbows may have strong corrosion resistance and prevent a corrosive fluid from damaging the elbows 13. In some embodiments, the elbows 13 and the straight pipes may be connected by the metal flange, and the metal flange may carry a large load pressure, which may carry the elbows 13 to be affected from the fluid. In some embodiments, the count (or the number) of elbows in the circulation loop 18 may exceed one. A plurality of elbows may be arranged at a plurality of different corners of the circulation loop 18. Each of the plurality of elbows may have different bending level. The bending level of an elbow refers to the included angle between the two end regions of the elbow. In some embodiments, the range of bending level of the elbow may be 30°-90°. According to the experimental requirements, the circulation loop 18 may be constructed by using the elbows with different bending levels, which may simulate the erosion experiment of the samples 17 at different erosion angles, so as to study the influence of erosion angles on the samples 17. In some embodiments, the plurality of corners of the circulation loop 18 may be provided with the elbows and the samples 17. Each of the plurality of corners of the circulation loop 18 may be provided with an elbow and at least one sample. The bending level of each of the plurality of elbows may be different from each other, so as to simulate the erosion experiment of the samples 17 at different erosion angles at the same time.

In some embodiments, the experimental device for simulating the erosion of the tubing string caused by sand production may include a sand discharge assembly for discharging the fluid in the circulation loop 18. The sand discharge assembly may include a gravel collector 23 connected with a sand discharge port 21 of the circulation loop

18. The circulation loop 18 may be provided with a sand discharge valve 22 at the sand discharge port 21. The gravel collector 23 may be provided with a filter 24. A collection port 25 of the gravel collector 23 may be connected with a treatment tank 26. By collecting and weighing the gravel in the gravel collector 23, the erosion experiment of the samples 17 at different quantities of sand production may be simulated. The fluid, such as gas or liquid passing through the filter 24 may be introduced into the treatment tank 26 to avoid polluting the environment and ensure the sustainability of the experiment.

In some embodiments, the experimental device for simulating the erosion of the tubing string caused by sand production may simulate the erosion experiment of the samples 17 in high temperature, high pressure, and corrosion environment. Firstly, the circulation loop 18 may be sealed and connected inside the autoclave 1, and the gravel is added through the sand feeder 3 with a piston. The piston may push the gravel in the sand feeder 3 into the feeding pipe, and the piston may also control the amount of gravel into the feeding pipe. Then, according to the experimental requirements, the inlet valve 2 may be opened to make one or more types of corrosive gases enter the feeding pipe to simulate the gas-sand two-phase fluid, or the inlet valve 8 may be opened to make the liquid enter the feeding pipe to simulate the liquid-sand two-phase fluid, or the air inlet valve 2 and the liquid inlet valve 8 may be both opened to make the corrosive gas and liquid enter the feeding pipe to simulate the gas-liquid-solid three-phase fluid. Then, the pump 15 may be started to make the fluid circulate in the autoclave 1. The flow velocity of the fluid may be monitored through the flowmeter 10, and the temperature and pressure may be monitored through the temperature and pressure sensor 16, so as to simulate the high temperature, high pressure, and dynamic corrosion environment that is closer to or the same as the working condition of the actual sand production wellbore. In the experiment, the samples 17 may be installed on both sides of the circulation loop 18 in the autoclave 1. For example, the circulation loop 18 may include a left vertical section, a right vertical section, and the elbows 13. The samples 17 with different materials may be respectively arranged at the left vertical section, the right vertical section, and the elbows 13, which may simulate the erosion experiment of samples of different materials at the same time. The test string 20 connected by metal flange 19 in the horizontal section of the circulation loop 18 may be used to simulate the erosion experiment of the horizontal section of the extended reach well in the downhole. The experimental device for simulating the erosion of the tubing string caused by sand production may simulate the erosion experiments of the samples caused by sand production at different particle sizes, different flow velocities, different quantities of sand production, and/or different erosion angles. The experimental results may be more accurate in studying the impact of sand production on the performance of oil well pipes.

In some embodiments, the experiment device for simulating the erosion of the tubing string caused by sand production may simulate the erosion of the samples 17 in high temperature, high pressure, and corrosion environment. The method of using the experiment device for simulating the erosion of the tubing string caused by sand production may include the following process:

(1) Experimental Preparation Stage

The samples 17 may be processed according to a shape of the circular opening of the pipe wall of the circulation loop 18, and the samples 17 may be assembled on the pipe wall of the circulation loop 18 with reference to FIG. 2 and its related description.

According to the experimental requirements, the test string 20 may be assembled in the horizontal section of the circulation loop 18.

According to the experimental requirements for the erosion angle, the elbow with the bending level corresponding to the required erosion angle may be selected and arranged in the circulation loop 18.

According to the experimental requirements for gravel particle sizes, the screen pipe 5 including the screen holes corresponding to the required diameter may be selected and arranged at the sand feeder 3.

(2) Experimental Feeding Stage

Gravel may be added through the sand feeder 3 with the piston, and the sand inlet valve 4 may be opened.

Then, according to the experimental requirements for fluid conditions, other valves may be selectively opened to simulate two-phase flow experiment or three-phase flow experiment.

For example, for the gas-solid two-phase flow experiment, the air inlet valve 2, the compressor 6, and the gas and solid inlet valve 7 may be opened, respectively, to make the gas-sand fluid into the autoclave 1 and then the main valve 9 may be opened.

As another example, for the liquid-solid two-phase flow experiment, the liquid inlet valve 8, the compressor 6, and the gas and solid inlet valve 7 may be opened, respectively, to make the gas-sand fluid into the autoclave 1 and then the main valve 9 may be opened.

As another example, for the gas-liquid-solid three-phase flow experiment, the air inlet valve 2, the liquid inlet valve 8, the compressor 6, and the gas and solid inlet valve 7 may be opened, respectively, to make the gas-sand fluid into the autoclave 1 and then the main valve 9 is opened.

The flowmeter 10 may be observed to ensure that the fluid flows into the circulation loop 18, that is, when the flowmeter 10 monitors the passage of the fluid, it is indicated that the fluid has flowed into the circulation loop 18. Continuing to observe the flowmeter 10, when the flow rate monitored by the flowmeter 10 reaches the required threshold, it is indicated that the fluid from the one or more gas tanks, the sand feeder 3, and/or the one or more liquid tanks fills the circulation loop 18. At this time, the air inlet valve 2, the sand inlet valve 4, the liquid inlet valve 8, and the main valve 9 may be closed.

(3) Experiment Stage of Simulating Erosion of Sand Production

The autoclave 1 may be pressurized and heated, the temperature and pressure sensor 16 monitor the temperature and pressure in the circulation loop 18 and transmit the temperature and pressure information in the circulation loop 18 to the terminal device (e.g., PC 27). When the temperature and pressure in the circulation loop 18 detected by the temperature and pressure sensor 16 reaches the required temperature and pressure by the experiment, the switch of the pump 15 may be turned on to make the internal fluid flow and the experiment of simulating sand production on the samples 17 and the test string 20 may start.

(4) Experimental Post-Processing Stage

After the experiment, when the temperature inside the autoclave 1 is decreased to a value, the sand discharge valve 22 may be opened to discharge the fluid in the circulation loop 18 of the autoclave 1, gravel may be collected through the gravel collector 23, and the fluid may be introduced into the treatment tank 26. The liquid inlet valve 8 may be opened to introduce clean water or washing solution through the feeding pipe to clean the circulation loop 18 in the autoclave 1 for the next experiment. The cleaned liquid after cleaning the circulation loop 18 may be collected through the sand discharge assembly, the gravel in the cleaned liquid may be collected by the gravel collector 23, and the remaining liquid may flow into the treatment tank through the filter 24 in the gravel collector 23.

The samples 17 may be removed from the pipe wall of the circulation loop 18, and the eroded surface of the samples 17 that is eroded by the fluid in the circulation loop 18 (i.e., eroded samples 17) may be observed and recorded. In some embodiments, the samples 17 may be weighed and the reduced weight of the samples 17 may be recorded. The reduced weight of the samples 17 may be a difference between the weight of the samples 17 before the experiment and the weight of the eroded samples 17.

The test string 20 may be removed from the horizontal section of the circulation loop 18, and the eroded surface of the test string 20 that is eroded by the fluid in the circulation loop 18 (i.e., eroded test string 20) may be recorded. In some embodiments, the test string 20 may be weighed and the reduced weight of the test string 20 may be recorded.

(5) Changing the Experimental Conditions and Repeating the Above Operations

According to the experimental requirements, the screen pipe may be adjusted or replaced to simulate the gravels with different particle sizes, the power of the pump 16 may be adjusted to simulate different flow velocities, the erosion experiment of the samples may be simulated by collecting and weighing the gravel in gravel collector 23, and the bending level of the elbow may be adjusted or replaced to simulate the erosion angles (e.g., 120 degrees, 90 degrees, 80 degrees, 60 degrees, 40 degrees, etc.), and the relevant data may be recorded, including but not limited to the distribution of sand particle size, quantities of sand production, flow velocity, flow rate, temperature, pressure, erosion angle, or the like.

Figure 3:
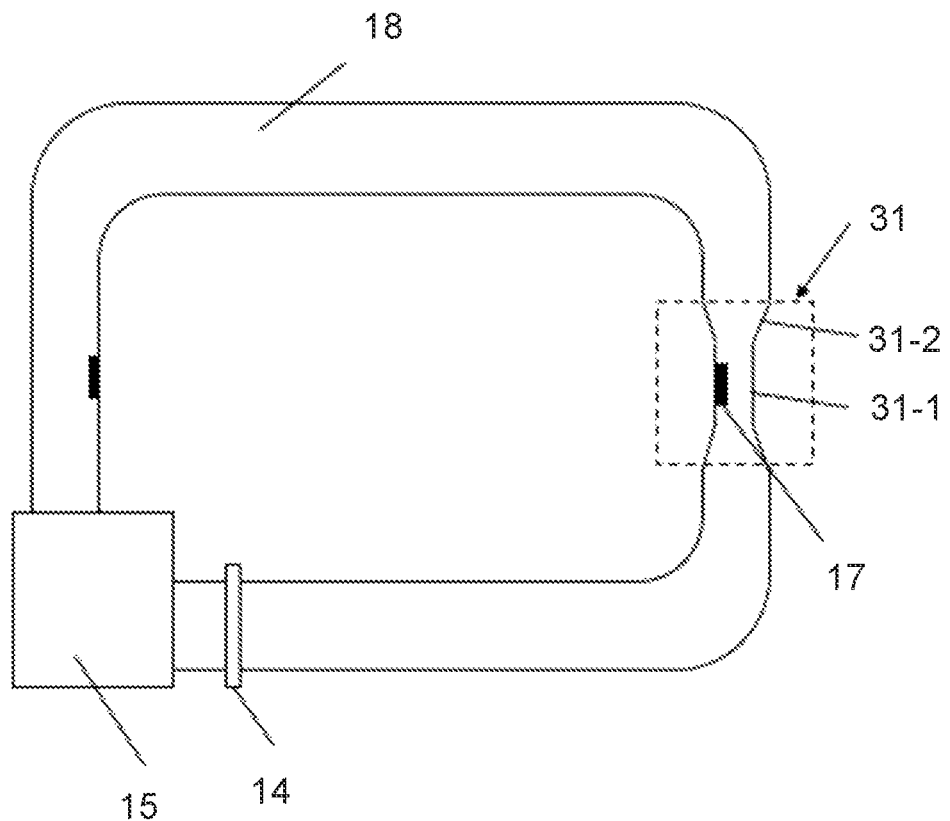
FIG. 3 is a schematic diagram illustrating an exemplary structure of a throat according to some embodiments of the present disclosure.

FIG. 3 is a schematic diagram illustrating an exemplary structure of a throat according to some embodiments of the present disclosure.

In order to simulate the erosion of the samples 17 at different flow velocities in one experiment, in some embodiments, as shown in FIG. 3, the circulation loop 18 may include a throat 31, which may be arranged on the horizontal and/or vertical sections of the circulation loop 18. In some embodiments, a diameter of the throat 31 may be different from diameters of other positions (i.e., non-throat) of the circulation loop 18, so that the test environment (e.g., flow velocity, pressure, etc.) in the throat 31 is different from the test environment in the non-throat of the circulation loop 18, so as to simulate the erosion of the samples 17 under different test environments. One of the samples 17 may be provided at the throat 31. In some embodiments, the throat 31 may be a tubular structure, and the inner wall of the tubular structure may be provided with the sample. The diameter of the throat 31 may be a diameter of a cross-section of the tubular structure that is perpendicular to the axis of the tubular structure. The diameter of the circulation loop 18 may refer to a diameter of a cross-section of the circulation loop 18 that is substantially perpendicular to a flow direction of the fluid in the circulation loop 18, also referred to as a minimum distance between the inner wall and outer wall of the circulation loop 18. In some embodiments, the diameter of the throat 31 may be less than the diameter of the non-throat in the circulation loop 18. In some embodiments, the diameter of the throat 31 may be greater than the diameter of the non-throat in the circulation loop 18. In some embodiments, the throat 31 may be connected with and located at the vertical section (as shown in FIG. 3) or the horizontal section of the circulation loop 18.

In some embodiments, the throat 31 may be a venturi structure. The throat 31 may include a straight section 31-1 and inclined sections 31-2. The straight section 31-1 may be located in the middle region of the throat 31, and the inclined sections 31-2 may be respectively connected with two ends of the straight section 31-1. The throat 31 may be connected with the circulation loop 18 (i.e., the pipe wall) via the inclined sections 31-2. In some embodiments, the samples 17 may be arranged on the straight section 31-1 and/or the inclined sections 31-2. The positions of the samples 17 at the throat 31 may be set according to the experimental requirements (e.g., flow velocity, pressure, etc.). The straight section 31-1 may be parallel to the vertical section or the horizontal section of the circulation loop 18.

In some embodiments, the sample 17 may also be arranged on a side opposite to the throat 31 in the circulation loop 18, and the sample 17 is symmetrically arranged with the sample 17 arranged at the throat 31. The erosion of the samples 17 at different flow velocities and/or pressures may be simulated in the same experiment by symmetrically setting samples 17.

In some embodiments, the diameter of the throat 31 may be variable. In some embodiments, the diameter of the throat 31 may refer to the diameter of the straight section 31-1. By adjusting the diameter of the throat 31, the sample arranged at the throat 31 may be placed in different test environments (such as flow velocity or pressure), so as to simulate the erosion of the samples 17 under different test environments.

Figure 4:
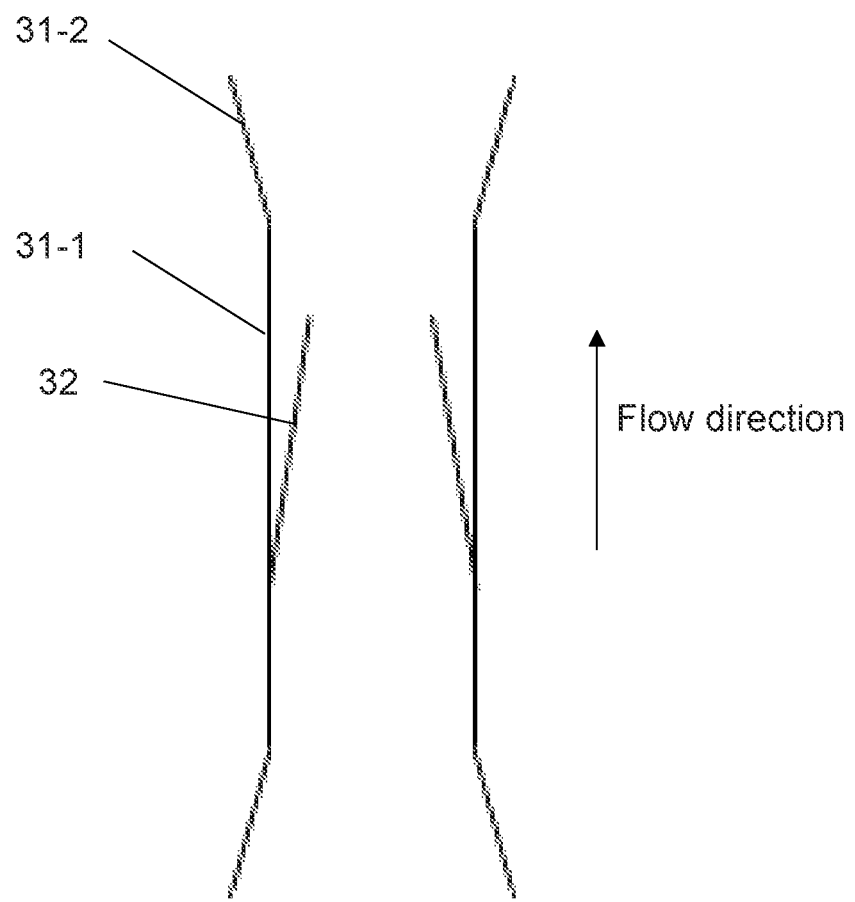
FIG. 4 is a schematic diagram of an exemplary structure of a throat according to other embodiments of the present disclosure.

In some embodiments, referring to FIG. 4, a plurality of fan plates 32 may be arranged on the inner surface of the wall of the straight section 31-1 of the throat 31, and the plurality of fan plates 32 may be distributed circumferentially along the wall of the straight section 31-1. The diameter of the throat 31 may be changed by the fan plates 32. One end (also referred to as a fixed end) of each of the fan plates 32 is connected with the wall of the straight section 31-1, and the other end (also referred to as a free end) of each of the fan plates 32 may be free. The each of the fan plates 32 may rotate or turn though, for example, a rotating shaft, to change an angle between the fan plate and the wall of the straight section 31-1. For example, if a fan plate rotates or turns toward the wall of the straight section 31-1, the angle between the fan plate and the wall of the straight section 31-1 may be decreased. If all the fan plates 32 rotate or turn toward the wall of the straight section 31-1, the fan plates 32 may be in an expanding state. As used herein, a fan plate rotates or turns toward the wall of the straight section 31-1 refers to that the fan plate rotates or turns around the fixed end of the fan plate such that the free end of the fan plate of the fan plate has a smaller distance from the wall of the straight section 31-1 along the rotation of the fan plate. As another example, if a fan plate rotates or turns away from the wall of the straight section 31-1, the angle between the fan plate and the wall of the straight section 31-1 may be increased. As used herein, a fan plate rotates or turns away from the wall of the straight section 31-1 refers to that the fan plate rotates or turns around the fixed end of the fan plate such that the free end of the fan plate has a larger distance from the wall of the straight section 31-1 along the rotation of the fan plate. If all the fan plates 32 rotate or turn away from the wall of the straight section 31-1, the fan plates 32 may be in a closing state. The expanding state or closing state of the fan plates 32 may change the diameter of the throat 31. Specifically, when the fan plates 32 are expanded (i.e., in an expanding state), the fan plates 32 may be parallel or approximately parallel to the wall of the straight section 31-1. At this time, the diameter of the straight section 31-1 may be a diameter of a circle formed by the ends (e.g., the free end) of the fan plates 32 (a thickness of the fan plate may be ignored). When the fan plates 32 are being closed (i.e., in the closing state), the fan plates 32 may tilt relative to the wall of the straight section 31-1, and an angle between each of the fan plates 32, the wall of the straight section 31-1 may be increased. The diameter of the straight section 31-1 may be a diameter of a circle formed by the ends (e.g., the free end) of the fan plates 32 that are decreased along the fan plates 32 turn away from the wall of the straight section 31-1, so as to change (reduce) the diameter of the straight section 31-1. In some embodiments, the diameter of the throat 31 may be adjusted by setting the state the fan plates 32, such as the expanding state or the closing state, and the change amount of the diameter of the throat 31 may be adjusted by changing the degree of the expanding state or the closing state of the fan plate 32. In some embodiments, the samples 17 may be arranged on the inner sides of the fan plates 32. The degree of the expanding state or the closing state may be defined by an angle between each fan plate and the wall of the straight section 31-1 or a distance between the free end of each fan plate and the wall of the straight section 31-1. The greater the angle between each fan plate and the wall of the straight section 31-1 is or the larger a distance between the free end of each fan plate and the wall of the straight section 31-1, the greater the degree of the closing state may be and the smaller the degree of the expanding state may be.

In some embodiments, the diameter of the throat 31 may be automatically adjusted. The experimental device may automatically set the diameter of the throat 31 according to the experimental parameters input by the user, and the experimental parameters (such as flow parameters, pressure parameters, fluid composition parameters, etc.) may be inputted by the user according to the experimental requirements (such as flow velocity, pressure, fluid composition, etc.).

In some embodiments, the automatic setting of the diameter of the throat 31 may be realized using a trained machine learning model. The trained machine learning model may automatically control the diameter of the throat 31. The input of the trained machine learning model may be target test parameters. The target test parameters may include a target flow velocity, a target pressure, a target temperature, a target fluid composition (e.g., gas content, liquid content, sand content), or the like, or a combination thereof. The output of the trained machine learning model may be the diameter of the throat 31. The trained machine learning model may be obtained by training an initial machine learning model (e.g., a neural network model) based on training samples. In some embodiments, the training samples may include sample experimental parameters and training labels. In some embodiments, the sample experimental parameters may include flow velocity, pressure, temperature, fluid composition (e.g., gas content, liquid content, sand content), or the like. In some embodiments, the training label may be a desired diameter of the throat 31. In some embodiments, the training label may be obtained from historical experimental data, or obtained by manual annotation. In some embodiments, the machine learning model may include a deep neural network (DNN) model or a convolutional neural network (CNN) model.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure, or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures, or characteristics may be combined as suitable in one or more embodiments of the present disclosure.

Furthermore, the recited order of elements or sequences, or the use of numbers, letters, or other designations thereof, are not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

What is claimed is:

1. An experimental device for simulating erosion of a tubing string caused by sand production, comprising:
   a high temperature autoclave;
   a circulating assembly, which is sealed and arranged in the high temperature autoclave, including a circulation loop including straight pipes and elbows, wherein:
   the straight pipes form pipe walls that include a left vertical section and right vertical section, a horizontal section of the circulation loop is provided with a test string, each of the left vertical section, the right vertical section, and the elbows of the circulation loop is provided with at least one sample of the plurality of samples, and the pipe walls and the elbows of the circulation loop are provided with a plurality of circular openings, each of the plurality of samples being embedded at one of the plurality of circular openings, and each of the plurality of samples being fixed to the circular opening of the pipe walls and the elbows of the circulation loop through a base, one or more screw bolts, and a sealing ring, the base being resistant to a high temperature, a high pressure, and corrosion;

a power assembly including a high temperature and high pressure pump arranged on the circulation loop;

a monitoring assembly including a high temperature and high pressure flowmeter and a temperature and pressure sensor for detecting the circulation loop, and the temperature and pressure sensor being communicatively connected with a PC; and a three-phase feeding assembly including a feeding pipe that is in fluid communication with the circulation loop, and the feeding pipe being connected with one or more corrosive gas tanks, a sand feeder, and one or more liquid tanks, respectively.

2. The experimental device of claim 1, wherein at least one of the one or more corrosive gas tanks is configured with an air inlet valve, the sand feeder is configured with a sand inlet valve, and the one or more corrosive gas tanks and the sand feeder are configured with an air and solid inlet valve, a compressor is arranged between the one or more corrosive gas tank and the air and solid inlet valve or between the sand feeder and the air and solid inlet valve, at least one of the one or more liquid tanks is configured with a liquid inlet valve, and the feeding pipe is configured with a main valve.

3. The experimental device of claim 1, wherein the high temperature autoclave is a cylindrical tank, which is made of one or more materials with good corrosion resistance, high temperature resistance, and high pressure resistance.

4. The experimental device of claim 1, wherein an outer surface of the high temperature autoclave is sleeved with a heating sleeve, and an exhaust port is located at an upper end of the high temperature autoclave, the exhaust port being in fluid communication with the circulation loop.

5. The experimental device of claim 1, wherein the test string is connected with the circulation loop through a metal flange.

6. The experimental device of claim 1, wherein the sand feeder is configured with a screen pipe connected with the feeding pipe.

7. The experimental device of claim 1, wherein the circulation loop is provided with a backflow preventer.

8. The experimental device of claim 1, wherein the elbows are made of C276 alloy, the elbows being connected with the straight pipes through the metal flange.

9. The experimental device of claim 1, further comprising:

a sand discharge assembly including a gravel collector connecting with a sand discharge port of the circulation loop, the circulation loop being provided with a sand discharge valve at the sand discharge port, the gravel collector being provided with a filter, and a collection port of the gravel collector being connected with a treatment tank.

* * * * *